United States Patent
Olson et al.

(10) Patent No.: US 7,539,720 B2
(45) Date of Patent: May 26, 2009

(54) LOW LATENCY INTEGER DIVIDER AND INTEGRATION WITH FLOATING POINT DIVIDER AND METHOD

(75) Inventors: Christopher H. Olson, Austin, TX (US); Jeffrey S. Brooks, Austin, TX (US); Paul J. Jagodik, Austin, TX (US)

(73) Assignee: Sun Microsystems, Inc., Santa Clara, CA (US)

( * ) Notice: Subject to any disclaimer, the term of this patent is extended or adjusted under 35 U.S.C. 154(b) by 891 days.

(21) Appl. No.: 11/014,026

(22) Filed: Dec. 15, 2004

(65) Prior Publication Data

US 2006/0129625 A1    Jun. 15, 2006

(51) Int. Cl.
*G06F 7/44*    (2006.01)
*G06F 7/52*    (2006.01)

(52) U.S. Cl. .................... 708/504; 708/650

(58) Field of Classification Search ......... 708/650–656, 708/504
See application file for complete search history.

(56) References Cited

U.S. PATENT DOCUMENTS

| | | | |
|---|---|---|---|
| 4,761,757 A | 8/1988 | Sakai et al. | |
| 4,939,686 A | 7/1990 | Fandrianto | |
| 4,992,968 A * | 2/1991 | Adiletta | 708/650 |
| 4,999,801 A | 3/1991 | Katsuno | |
| 5,023,827 A | 6/1991 | Kehl et al. | |
| 5,105,378 A | 4/1992 | Mori | |
| 5,132,925 A | 7/1992 | Kehl et al. | |
| 5,206,828 A | 4/1993 | Shah et al. | |
| 5,258,944 A | 11/1993 | Smith | |
| 5,272,660 A | 12/1993 | Rossbach | |
| 5,301,139 A | 4/1994 | Zinger | |
| 5,339,267 A * | 8/1994 | Ito | 708/650 |
| 5,357,455 A | 10/1994 | Sharangpani et al. | |
| 5,515,308 A | 5/1996 | Karp et al. | |
| 5,619,439 A | 4/1997 | Yu et al. | |
| 5,696,712 A | 12/1997 | Prabhu et al. | |
| 5,757,688 A * | 5/1998 | Chen et al. | 708/653 |
| 5,787,030 A | 7/1998 | Prabhu et al. | |
| 5,798,955 A | 8/1998 | Matsubara | |
| 5,870,323 A | 2/1999 | Prabhu et al. | |
| 5,910,910 A | 6/1999 | Steele, Jr. | |
| 5,928,318 A | 7/1999 | Araki | |
| 5,954,789 A | 9/1999 | Yu et al. | |
| 6,108,682 A | 8/2000 | Matheny | |
| 6,351,760 B1 | 2/2002 | Shankar et al. | |
| 6,549,926 B1 | 4/2003 | Kalambur et al. | |

(Continued)

OTHER PUBLICATIONS

Prabhu, et al., "167 MHz Radix-8 Divide and Square Root Using Overlapped Radix-2 Stages", *1063-6889 IEEE*, pp. 155-162 (1995).

(Continued)

*Primary Examiner*—Tan V Mai
(74) *Attorney, Agent, or Firm*—Martine Penilla & Gencarella, LLP

(57) ABSTRACT

A method and device divides a dividend by a divisor, the dividend and the divisor both being integers. The method and device determine a maximum possible number of quotient digits (NDQ) based on a number of significant digits of the divisor and the dividend, normalizes the dividend and divisor, and calculates NDQ number of quotient digits from the normalized divisor and dividend.

17 Claims, 4 Drawing Sheets

U.S. PATENT DOCUMENTS

| | | |
|---|---|---|
| 6,564,239 B2 | 5/2003 | Matson et al. |
| 6,594,681 B1 | 7/2003 | Prabhu |
| 6,625,633 B1 | 9/2003 | Hirairi |
| 6,751,645 B1 | 6/2004 | Gorshtein et al. |
| 2004/0249877 A1 | 12/2004 | Gerwig et al. |

OTHER PUBLICATIONS

Combined Search and Examination Report for United Kingdom Patent Application GB0523944.7, dated Feb. 23, 2006.

Chin-Chieh Chao, Statutory Invention Registration, Reg. No. US H1993 H, published Sep. 2, 2001.

* cited by examiner

LOW LATENCY INTEGER DIVIDER AND INTEGRATION WITH FLOATING POINT DIVIDER AND METHOD

BACKGROUND OF THE INVENTION

1. Field of the Invention

The present invention relates generally to arithmetic logic units and in particular to dividers.

2. Description of the Related Art

Dividers are used in microprocessors and data-processing devices to perform arithmetic division. Because floating-point numbers and integers are represented differently in binary, and because the operations differ as a result, separate floating point and integer dividers are generally provided. Typically, floating point division is considered to be more important for high-demand applications, such as graphics and multimedia applications. Also, integer division is not performed with the same frequency as other mathematical operations. And so, many manufacturers save die real estate by providing only the most basic single bit per cycle (radix-2) integer divider, which reduces performance. While combined floating point and integer dividers are known, they generally have not provided significant performance or space-efficiency improvements over separate dividers.

Integer division and floating point division are commonly performed using one of a variety of well-known subtractive algorithms. Subtractive algorithms each include a sequence of shift, subtract, and compare operations. Among subtractive algorithms, restoring, non-restoring, non-performing, and the Sweeney, Robertson, and Tocher (SRT) division algorithms are known.

Subtractive division works similarly to standard long division. Each digit of the dividend, starting with the most significant digit, is compared to the divisor, and a digit of the quotient is computed. In computers, this is accomplished by the typical one bit per cycle (radix-2) integer divider by aligning the most significant bit of the dividend with the least significant bit of the divisor, subtracting the aligned digits, shifting the partial remainder to the left, subtracting, shifting again, and so on. For a 64-bit number, the minimum number of cycles is 64, plus several cycles for setting up the computation. Even in cases where the numbers have significantly fewer digits or the dividend is smaller than the divisor (a case which always results in zero for integer numbers) the entire process is performed. Thus, even radix-4 and radix-8 integer dividers, which process multiple bits per cycle, can be very inefficient.

An exemplary prior art non-restoring integer divider 20 is schematically represented in FIG. 1. The 64-bit dividend is right shifted by 63 bits using concatenation 22. The concatenated 128 bit word is stored in flip-flop 26. The left 65 bits, including one sign bit and the 64 bit partial remainder are read out and added in adder 34. The divisor is stored in flip-flop 28, converted into its two's compliment form using XOR 32, and added in carry-lookahead adder 34. The result from adder 34 is the partial remainder from which quotient digit 38 q(i) is calculated. Concatenation 36 combines the right 63 bits from split 29 with result from adder 34 and q(i). The cycle repeats 64 times and the final result is stored in the least significant 64 bits of flip-flop 26.

Floating point numbers are generally stored in binary as $A=S_a r^{E_a}$ which includes a normalized significand $S_a$ multiplied by the radix r raised to the $E_a$ power. The significand, when normalized, has a 1 in the most significant position and a decimal point immediately after the most significant position. Floating-point algorithms operate on the significand portions of the operands in a manner similar to the integer division algorithm described above, with the exponents being subtracted. However, with floating point division, division stops when the remainder is zero.

The Prabhu/Zyner algorithm presented in "167 MHz Radix-8 Divide and Square Root Using Overlapped Radix-2 Stages," 12th Symposium Computer Arithmetic, Bath, England, 1995, pages 155-162, J. Arjun Prabhu and Gregory B. Zyner, which is wholly incorporated herein by reference, shows an exemplary radix-8 floating point SRT algorithm. The Prabhu/Zyner algorithm uses carry-save adders (CSA) to perform multiple SRT division steps stacked in a single cycle, resulting in a low latency floating point divide.

It would be desirable to improve the performance of integer division as well as leverage existing hardware present in a floating-point divider such as the Prabhu/Zyner divider to reduce real estate requirements on the die while at the same time improving division performance on integer numbers.

SUMMARY OF THE INVENTION

Broadly speaking, the present invention fills these needs by providing an efficient method and device for dividing an integer dividend by an integer divisor. The method can be used with existing floating point dividers.

It should be appreciated that the present invention can be implemented in numerous ways, including as a process, an apparatus, a system, a device, or a method. Several inventive embodiments of the present invention are described below.

In one embodiment, a method for dividing an integer dividend by an integer divisor includes determining a maximum possible number of quotient digits (NDQ) and calculating NDQ number of quotient digits from a normalized divisor and dividend. NDQ is determined based on the number of significant digits of the divisor and the dividend.

In another embodiment, a method for binary division comprises normalizing an integer divisor and dividend. The number of leading sign bits LS1 and LS2 are determined for the dividend and divisor, respectively. The divisor has n minus LS2 significant digits and the dividend n minus LS1 significant digits. A value NDQ is calculated as LS2 minus LS1 plus one. After normalizing, the dividend and divisor are passed to a subtractive divider which is operated to generate NDQ number of quotient digits.

In yet another embodiment, an integer divider includes a first register for receiving a binary representation of a divisor and a second register for receiving a binary representation of a dividend. NDQ logic calculates a maximum possible number of significant digits of a quotient NDQ based on a number of significant digits of the divisor and the dividend. At least one left shifter normalizes the divisor and the dividend. A subtractive divider generates NDQ number of quotient digits by dividing the normalized dividend by the normalized divisor.

The advantages of the present invention will become apparent from the following detailed description, taken in conjunction with the accompanying drawings, illustrating by way of example the principles of the invention.

BRIEF DESCRIPTION OF THE DRAWINGS

The present invention will be readily understood by the following detailed description in conjunction with the accompanying drawings, and like reference numerals designate like structural elements.

DETAILED DESCRIPTION OF THE PREFERRED EMBODIMENTS

Figure 1:
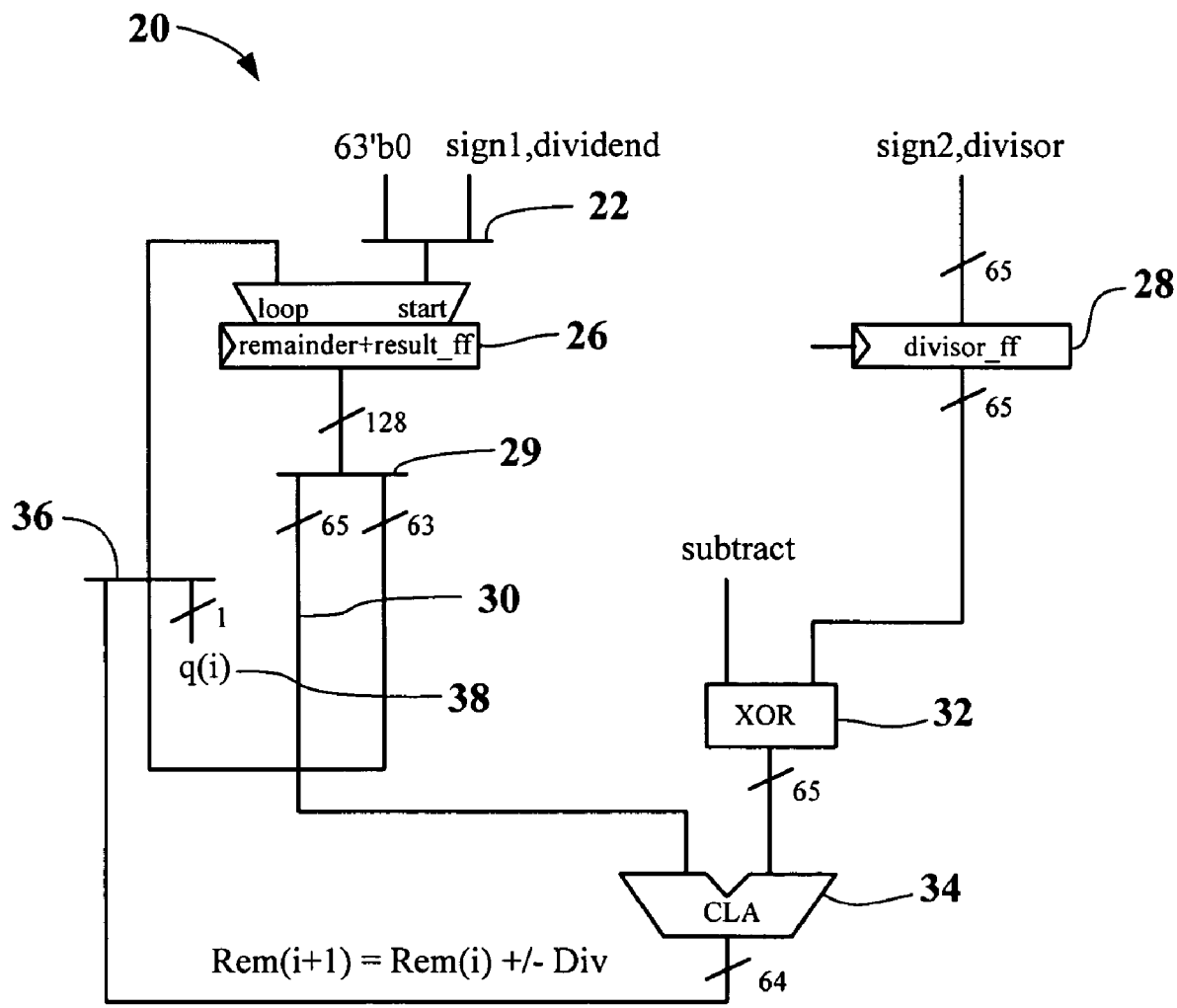
FIG. 1 shows a implementation schematic for an exemplary prior art non-restoring integer divider.
Figure 2:
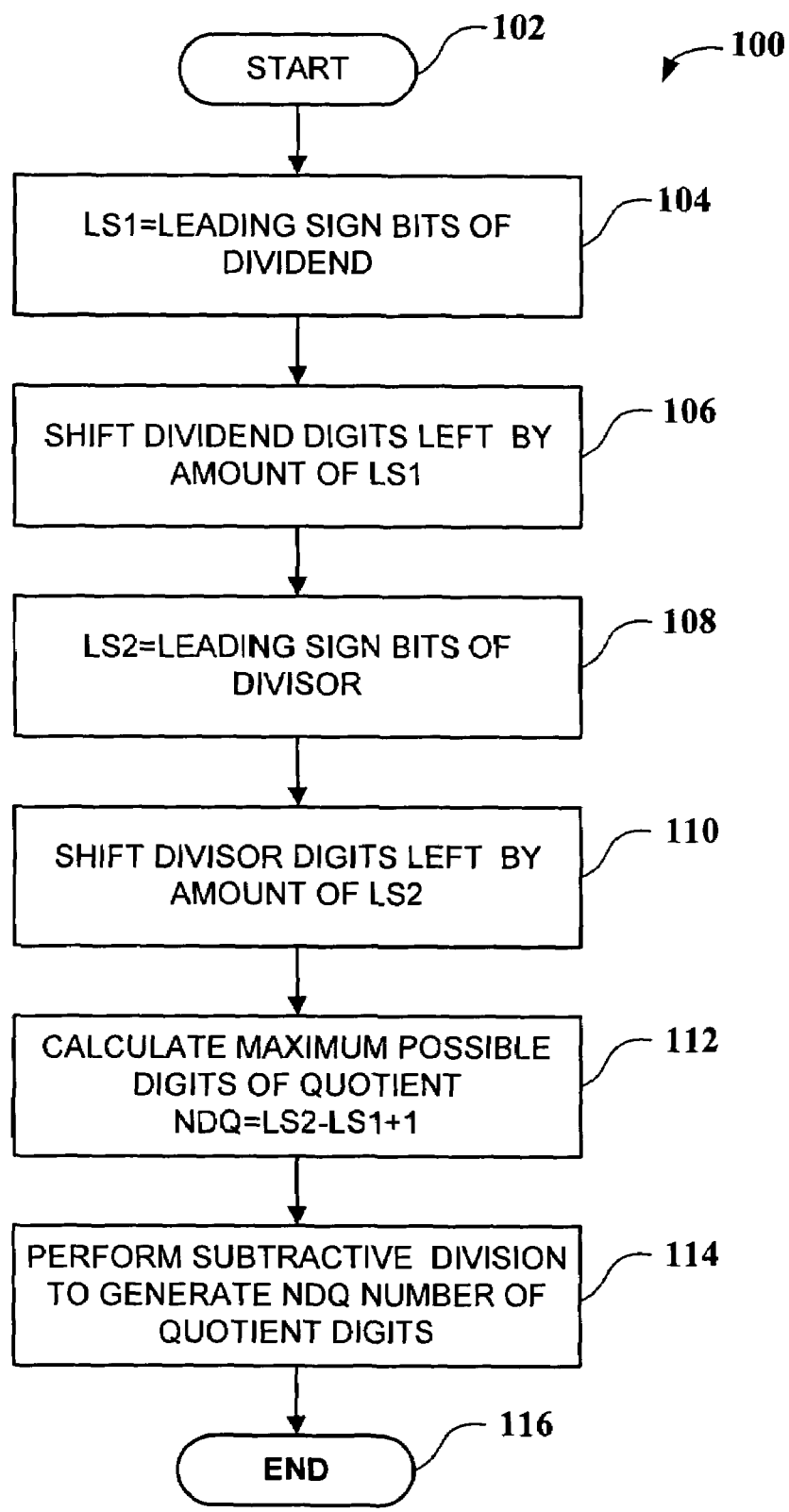
FIG. 2 shows a flowchart describing an exemplary method for efficiently carrying out integer division.

FIG. 2 shows a flowchart 100 describing an exemplary method for efficiently carrying out integer division. The procedure starts at start block 102 as shown and flows to operation 104 wherein the number of leading sign bits of the dividend is determined. The leading sign bits of a positive number will be the number of zeros before the most significant "1" bit. For negative numbers, represented, for example, in two's compliment or one's compliment format, the number of leading sign bits will be the number of leading ones before the most significant zero and, for two's compliment numbers, may be one less than that number. An assumption may be safely made regarding the number of sign bits for two's compliments so long as the resulting value for NDQ (equation 1 below) is not under-estimated.

After determining the number of leading sign digits of the dividend in operation 104, the procedure flows to operation 106, wherein the dividend is normalized, i.e., shifted left by that amount. After normalizing, the most significant digit of the dividend is at the most significant bit position, i.e., the left-most position.

The procedure mentioned above for the dividend is repeated for the divisor in operations 108 and 110, thereby normalizing the divisor. It should be noted that either dividend or the divisor may normalized first.

The procedure then flows to operation 112 wherein the maximum possible number of digits in the quotient is calculated based on the number of sign digits in the original divisor and the dividend. Specifically, the following equation is carried out:

$$NDQ = LS2 - LS1 + 1 \qquad (1)$$

wherein, NDQ is the maximum possible number of digits in the quotient, LS2 is the number of leading sign digits in the divisor, and LS1 is the number of leading sign digits in the dividend. NDQ is therefore calculated based only on the number of significant digits of the two operands-not the actual value of the operands.

The procedure then flows to operation 114 wherein subtractive division is performed for NDQ number of quotient digits. The subtractive division may be performed by any known subtractive division algorithm or hardware implementation thereof. Since the dividend and divisor are both normalized, known floating point non-restoring division algorithms, such as floating point SRT division, can be used. When NDQ is zero or less than zero, the result is zero and no further calculation is necessary.

EXAMPLE 1

To illustrate the procedure outlined in FIG. 2, the calculation 6/2=3 will be calculated using 8-bit numbers:

Dividend=0000_0110 (+6)

Divisor=0000_0010 (+2)

Quotient=0000_0011 (+3)

For the dividend, LS1=5, since there are 5 zeros before the first one in the dividend. Likewise, LS2=6 because there are six leading zeros in the divisor. The maximum possible number of quotient digits NDQ can now be calculated as follows using Eq. 1:

$$NDQ = 6 - 5 + 1 = 2 \qquad (2)$$

After normalizing:

Normalized Dividend=0_1100_0000 (sign bit added)

Normalized Divisor=0_1000_0000 (sign bit added)

Thus, the result is obtained by carrying out subtractive division on the above two normalized numbers for only two cycles. Since both numbers are positive integers, an exemplary 1-bit per cycle restoring integer division will be carried out below for illustration purposes. First, the two's compliment of the divisor is determined, to carry out the subtraction by adding. The two's compliment of the normalized divisor is 1_1000_0000 (with a sign bit added).

In the first step of the algorithm, the normalized divisor is added to the normalized dividend:

0_1100_0000

1_1000_0000

$$0\_0100\_0000 \qquad (3)$$

Since the sign of the remainder is the same as the dividend, the first bit of the quotient q(1) is 1. The quotient bits can be viewed as being placed in the least significant digit, then shifted to the left each time. Since the division loop is only performed twice (since we know at maximum there are only 2 significant digits in the answer, i.e., NDQ=2) the first bit will end up in the second least significant position.

In the second step, the partial remainder, 0_0100_0000, is shifted to the left by one digit and added again:

0_1000_0000

1_1000_0000

$$0\_0000\_0000 \qquad (4)$$

Again, since the sign of the remainder is the same as the dividend, the next bit of the quotient q(0) is one. The result is, as expected, 0000_0011 (+3).

EXAMPLE 2

Another example is presented for the calculation 10/2=5 using 8-bit numbers:

Dividend=0000_1010 (+10)

Divisor=0000_0010 (+2)

Quotient=0000_0101 (+5)

LS1=4 since there 4 zeros before the first one in the dividend. LS2=6 because there are six leading zeros in the divisor. The maximum possible number of quotient digits NDQ can now be calculated as follows using Eq. 1:

$$NDQ = 6 - 4 + 1 = 3 \qquad (5)$$

After normalizing:

Normalized Dividend=0_1010_0000 (sign bit added)

Normalized Divisor=0_1000_0000 (sign bit added)

Thus, the result is obtained by carrying out subtractive division on the above two normalized numbers for only three cycles. Since both numbers are positive integers, an exemplary 1-bit per cycle restoring integer division is carried out as follows. First, the two's compliment of the divisor is determined:

−Normalized Divisor=1_1000_0000

In the first step, the normalized divisor is added to the normalized dividend:

0_1010_0000

1_1000_0000

0_0010_0000 (6)

Since the sign of the remainder is the same as the dividend, the first bit of the quotient q(2) is 1. In the second step, the partial remainder is shifted to the left by one digit and added again:

0_0100_0000

1_1000_0000

1_1100_0000 (7)

Here, the result is a negative number and since the sign of the remainder is not the same as the dividend, the next bit of the quotient q(1) is zero. The final step in the algorithm is as follows:

0_1000_0000

1_1000_0000

0_0000_0000 (8)

Thus, the final result is q(2)=1, q(1)=0, and q(0)=1, so the quotient is 000_0101, or 5.

EXAMPLE 3

Another example is presented with the calculation will now be presented for 8/7=1 will be calculated using 8-bit numbers:

Dividend=0000_1000 (+8)

Divisor=0000_0111 (+7)

Quotient=0000_0001 (+1)

LS1=4 since there 4 zeros before the first one in the dividend. LS2=5 because there are six leading zeros in the divisor. The maximum possible number of quotient digits NDQ can now be calculated as follows using Eq. 1:

NDQ=5−4+1=2 (9)

After normalizing:

Normalized Dividend=0_1000_0000 (sign bit added)

Normalized Divisor=0_1110_0000 (sign bit added)

Thus, the result is obtained by carrying out subtractive division on the above two normalized numbers for only two cycles. Since both numbers are positive integers, an exemplary 1-bit per cycle restoring integer division is carried out as follows. First, the two's compliment of the divisor is determined:

−Normalized Divisor=1_0010_0000

The normalized dividend is then added to the normalized two's compliment divisor:

0_1000_0000

1_0010_0000

1_1010_0000 (10)

Since the sign of the remainder is not the same as the dividend, the first bit of the quotient q(1) is 0. In the second and last step, the dividend is restored and shifted to the left by one digit and added again:

1_0000_0000

1_0010_0000

0_0010_0000 (11)

The remainder is positive, which is the same as the original dividend. Therefore q[0]=1, which gives the full quotient as 00000001, which is the correct answer.

The above examples illustrate normalization of integer divisor and dividend operands for input into a division algorithm. Although the division was carried out using a simple restoring integer divider algorithm, it should be noted that the normalized operands are suitable for input into existing floating point non-restoring dividers, such as floating point SRT dividers.

Most subtraction division algorithms used today are of the non-restoring type. Non-restoring division allows for an overestimation of any given quotient digit to be corrected by the subsequent selection of one or more negative quotient digits. However, the estimated quotient digit must not be more than one greater than the correct quotient digit in order to subsequently reduce the partial remainder to zero, thus computing the correct result. Therefore, in order to keep the partial remainder within prescribed bounds, the quotient digit selection must never underestimate the correct digit, and if it over estimates the quotient digit, it must do so by no more than one.

In SRT non-restoring division, a partial remainder (PR) is calculated for each digit of the dividend (D) according to the following formula:

$PR_{i+1} = 2PR_i - q_{i+1}D$ (12)

Wherein $q_{i+1}$ is the quotient digit, and has possible values of −1, 0, or +1. This quotient digit is determined by the value of the previous partial remainder and is independent of the divisor. Studies have shown that only four bits of the partial remainder need to be calculated to correctly generate quotient digit selection digits and keep the partial remainder within prescribed bounds. (See, e.g., M. D. Ercegovac and T. Lang, *Division and Square Root: Digit-recurrence Algorithms and Implementations*, Kluwer Academic Publishers, 1994, ch. 3; S. Majerski, "Square-rooting algorithms for high-speed digital circuits," *IEEE Trans. Comput.*, vol. C-34, no. 8, pp. 724-733, August 1985; P. Monteschi and L. Ciminiera, "Simple radix 2 division and square root with skipping some addition steps," *Proc. Tenth IEEE Symp Comput. Arithmetic.* pp. 202-209, 1991; and V. Peng, S. Samudrala, and M. Gavrielov, "On the implementation of shifters, multipliers, and dividers in floating point units," *Proc. Eighth IEEE Symp. Comput. Arithmetic*, pp.95-101, 1987.)

The selection rules can be expressed as in the following table in which PR represents the most significant four digits of the actual partial remainder, and in which the decimal point appears between the third and fourth most significant digits. The partial remainder is in two's complement form, so that the first bit is the sign bit. To ensure proper computation, the partial remainder is constrained so that −5/2<2PR<3/2.

TABLE 1

Truth Table For Radix-2 Quotient

| 2PR | Quotient Digit |
|---|---|
| 101.1 (−5/2) | −1 |
| 110.0 (−2) | −1 |
| 110.1 (−3/2) | −1 |
| 111.0 (−1) | −1 |
| 111.1 (−1/2) | 0 |
| 000.0 (0) | +1 |
| 000.1 (1/2) | +1 |
| 001.0 (1) | +1 |
| 001.1 (3/2) | +1 |

For additional details concerning floating point SRT division and the table above, refer to the Prabhu/Zyner reference cited above and incorporated herein by reference.

Figure 3:
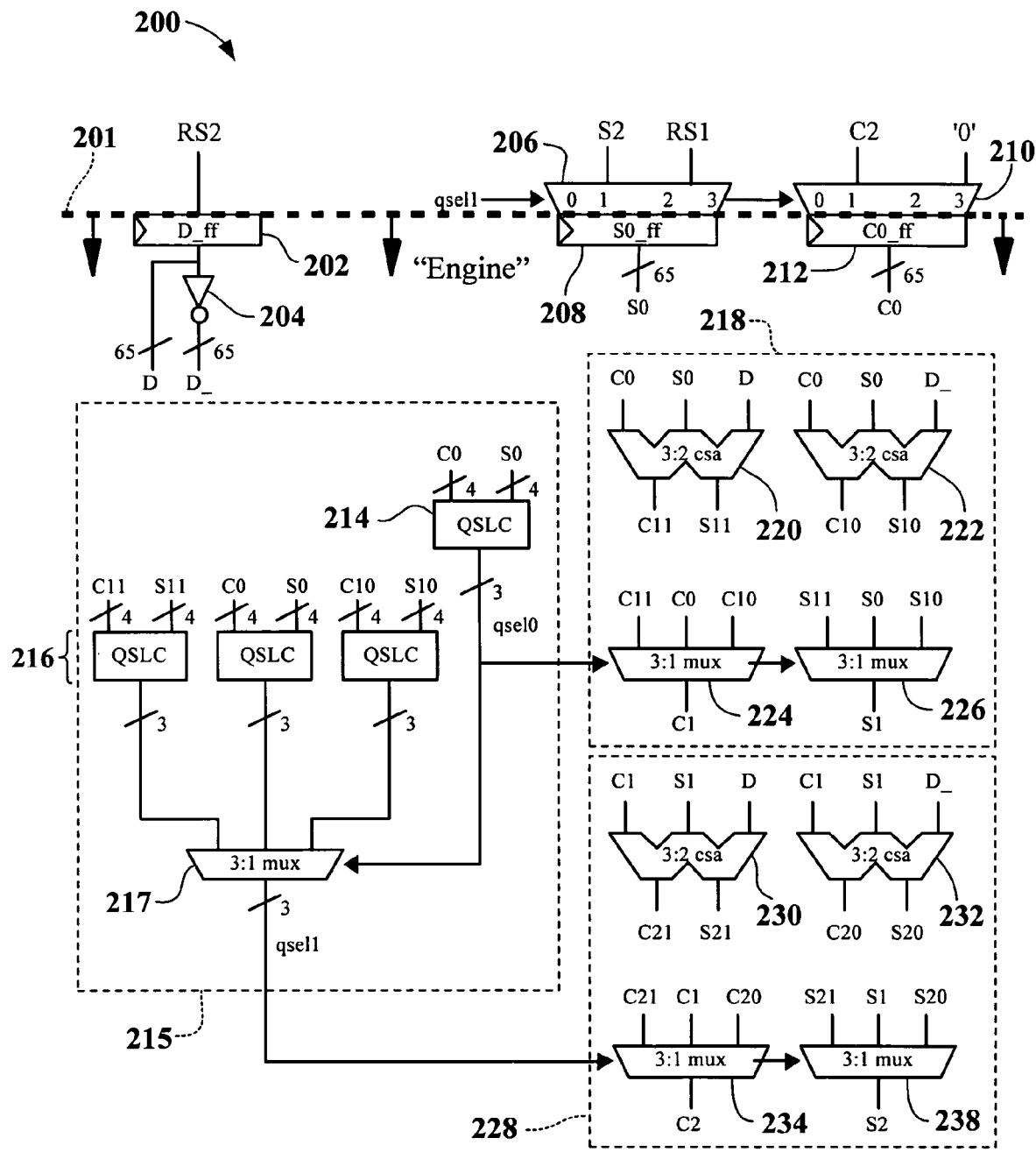
FIG. 3 shows an implementation schematic of an exemplary Radix-4 (2 bits per cycle) floating point SRT divider.

FIG. 3 shows a block-level representation of an implementation of an exemplary Radix-4 (2 bits per cycle) floating point SRT divider 200. SRT divider 200 includes an engine portion identified below dashed dividing line 201. Flip-flop 202 stores the divisor value (RS2) and outputs 65 bit divisor D including 64 data bits and one sign bit. Inverter gate 204 outputs a one's compliment (negative) version of the divisor, identified by "D_". Flip-flops 208 and 212 store the dividend RS1, and are used for storing partial remainders as well, as the dividend is commonly thought of as the initial partial remainder. Both sum and carry portions of the partial remainder are saved in respective flip-flops 208 and 212 to avoid having to use the slower and larger carry-lookahead adders. Instead of using carry-lookahead adders, carry-save adders 220, 222, 230, and 232 are used, which are more efficient. Initially, the dividend is stored into flip-flop 208 from input RS1 of multiplexer 206 and the flip-flop 212 stores zeros as indicated by "0" input to multiplexer 210. Flip-flops 208 and 212 receive inputs from respective multiplexers 206 and 210 having an output dependent upon a "qsel1" select signal generated from quotient selection logic block 215.

Quotient selection logic block 215 comprises a plurality of quotient selection logic circuits (QSLC). For each cycle, the carry portion of the partial remainder stored in flip-flop 212 and the save portion of the partial remainder stored in flip-flop 208, indicated as "C0" and "S0" are input into QSLC 214, which outputs a "qse10" signal for selecting a new quotient digit comprising one of −1, 0, or +1 as described above.

Block 218 is used for calculating a first digit of the quotient for each cycle. Carry save adders 220 and 222 each input the contents of flip-flops 208 and 212 and one of D from flip-flop 202 or D_from inverter 204. The outputs of carry save adders 220 and 222 are input into multiplexers 224 and 226 as shown. Multiplexers 224 and 226 receive select signal qse10 to generate C1 and S1 values, which are carry and save portions of an intermediate partial remainder. Block 228 includes carry save adders 230 and 232 and multiplexers 234 and 238 to determine the second quotient digit for each cycle. Select signal qse10 determines which of QSLCs 216 will select the second quotient digit by multiplexer 217. This second select signal, qsel1, is input into multiplexers 234 and 238 to determine the next partial remainder, which is stored back into flip-flops 208 and 212, but left-shifted (i.e., multiplied by two).

The quotient digits qse10 and qse11 are logged into two flip-flops (not shown). Each quotient digit for non-restoring SRT dividers can either be −1, 0, or +1. The quotient digits are stored in two flip-flops (not shown) which may be referred to as Qp1 and Qm1. When the quotient digit is +1, the digit is logged into Qp1 and when the digit is −1, the digit is logged into Qm1. When the quotient digit is zero, nothing is set in either the Qp1 or Qm1 flip-flops. The quotient selection logic described above with reference to FIG. 3, is used to select what values are loaded into the Qp1 and Qm1 flip-flops. In one embodiment, the quotient logging is reversed when the divisor is negative. Floating point hardware generally passes the quotient selection logic output to the multiplexer select input, and a constant of 1'b1 is wired to the data port of the multiplexer. To support a negative divisor, the constant is replaced by either the sign of the divisor and its complement. The complement is wired to Qp1 and the sign is wired to Qm1.

The exemplary SRT divider 200 described above with reference to FIG. 3 is one example of a divider usable with normalized integer operands according to the disclosed embodiments. As mentioned previously, any existing integer or floating point divider will work. However, to implement a procedure for handling integers according to disclosed embodiments, some processing of the operands must be performed prior to input into the divider engine. Specifically, the operands must be normalized, the value NDQ must be calculated, and the divider engine must be controlled so that it stops after the correct number of cycles, which depends upon NDQ.

Figure 4:
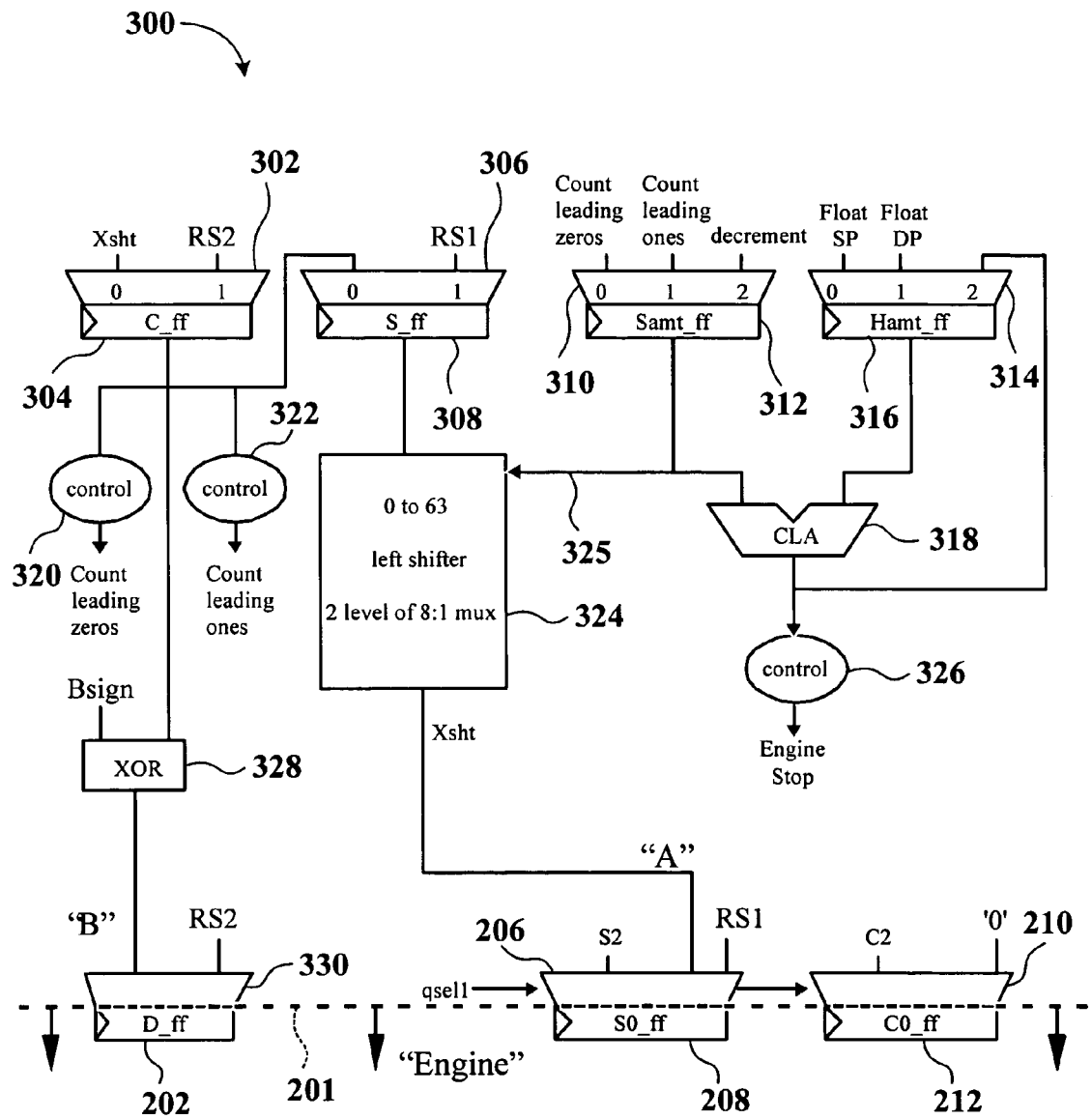
FIG. 4 shows an exemplary implementation schematic of an integer divider pre-engine for the divider shown in FIG. 3.

FIG. 4 shows an exemplary implementation of an integer divider pre-engine 300 for carrying out this processing. Specifically, this circuit normalizes the integer dividend and divisor, calculates NDQ, and stops the non-restoring divider engine 200 (FIG. 3) after the specified number of cycles, which depends on the value of NDQ.

The initial non-normalized integer divisor is input via RS2 input of multiplexer 302 into flip-flop 304, and the initial non-normalized integer dividend is input via RS1 input of multiplexer 306 into flip-flop 308. In a first cycle, control units 320, 322 calculate the leading zeros LZ (for a positive divisor) and leading ones L1 (for a negative divisor) to determine the leading sign bits of the divisor. The values LZ and L1 arrive at inputs (0, 1) of multiplexer 310 and the select value is based on the initial (sign) bit of the divisor. The value for the leading sign bits LS2 is then stored in flip-flop 312. The divisor value is output from flip-flop 304 and is input into the first input (0) of multiplexer 306 for input into flip-flop 308, taking the place of the dividend. Meanwhile, the dividend passes through left shifter 324 (without any shifting) and arrives at the Xsht input of multiplexer 302, to take the place of the divisor in flip-flop 304. This is indicated in FIG. 4 by the label "Xsht" at both the output of left shifter 324 and the input to multiplexer 302, which passes the shifted value to flip-flop 304.

In the second cycle, the number of leading sign bits LS1 of the dividend, now in flip-flop 304, are counted and stored in flip-flop 312. The dividend re-enters flip-flop 308 via the first input (0) of multiplexer 306. Meanwhile, the divisor passes through left shifter 324 and is left shifted by the amount of leading sign bits LS2, counted by control units 320 or 322, thereby normalizing the divisor. The amount of left shifting is input into left shifter 324 via data lines 325 in communication with flip-flop 312. The divisor is output from left shifter 324 and reenters flip-flop 304 via the Xsht input of multiplexer 302.

In the third cycle, the divisor, now normalized and located in flip-flop 304, passes through XOR 328 and enters flip-flop 202 for input into the divider engine. XOR 328 converts the divisor into a positive (one's compliment) when it is negative as indicated by Bsign. If the divisor is positive, then no change is made. Meanwhile, the dividend passes through left shifter 324 to normalize the dividend in the same manner that the divisor was previously normalized. After normalizing, the dividend is input via input "A" of multiplexer 206 into flip-flop 208, ready for division.

NDQ logic is provided for calculating the value NDQ. Specifically, the leading sign bits of the divisor LS2 counted in the first cycle is input into flip-flop 312 via multiplexer 310. Carry-lookahead adder 318 adds the value from flip-flop 312 to that of flip-flop 316, which is initially zero. The sum is stored back into flip-flop 316 via multiplexer 314. In the next clock cycle, the number of leading sign bits of the dividend is counted and that value is stored in flip-flop 312 via multiplexer 310. Carry-lookahead adder 318 then adds the two values in flip-flops 312 and 316, which now store the leading sign bits of the dividend and divisor, respectively. This sum is stored in flip-flop 316. After subtractive division starts, the amount in flip-flop 212 is decremented by an amount stored in flip-flop 312. Depending on the number of bits processed per cycle, the value stored in flip-flop 312 may be 1, 2, 3, etc. For the radix-4 division system shown in FIG. 3, which calculates two quotient digits per cycle, the decrement amount stored in flip-flop 312 would be two.

While the integer divider pre-engine 300 includes a single left shifter for normalizing both the dividend and the divisor, it is also possible to provide a left shifter for each operand.

In a non-restoring division algorithm, such as the radix-4 SRT algorithm discussed above with reference to FIG. 3, each step involves either an addition or subtraction of the divisor from the remainder. The sign of the next quotient digit is based solely on the sign of the remainder QSLCs 214 and 216 (FIG. 3) employ a table such as Table 1 above. Since this table is built for floating point division, the sign of the divisor is always positive, and this table is sufficient. However, the integer divisor may be either positive or negative.

In the embodiment described above with reference to FIG. 4, only the positive divisor is sent into the divider loop. The normalized divisor is passed through XOR 328 before it is loaded into the loop hardware and a Carry-in (not shown) completes the two's complementing. Because this does not slow down any timing critical loop hardware, it will not affect performance.

In another embodiment (not shown), a negative divisor is accounted for by allowing the divisor sign to factor into the quotient selection logic. Although this would solve the problem for negative divisors, it could lead to increased latency since the quotient selection logic is a critical circuit in most non-restoring dividers.

If the NDQ is not evenly divisible by the number of steps per cycle, then additional special handling must occur. For example, for a two-digit-per-cycle radix-4 SRT divider such as that described above with reference to FIG. 3, if NDQ is odd, then the loop will compute one more quotient digit than required. This extra quotient digit must be removed. In one embodiment, the loop hardware, which is timing critical, computes the quotient digits as normal. After the SRT loop is complete, the Qp1 and Qm1 are added using a carry lookahead adder. The extra quotient digits can be removed either before or after this add, wherever is most convenient. For example, if the carry-lookahead adder is isolated from the loop hardware by one or more cycles, it may be more convenient to remove the extra quotient digit prior to the add.

Although the foregoing invention has been described in some detail for purposes of clarity of understanding, it will be apparent that certain changes and modifications may be practiced within the scope of the appended claims. Accordingly, the present embodiments are to be considered as illustrative and not restrictive, and the invention is not to be limited to the details given herein, but may be modified within the scope and equivalents of the appended claims.

What is claimed is:

1. In a microprocessor, a method for dividing a dividend by a divisor, the dividend and the divisor both being integers, the method comprising:
    determining a maximum possible number of quotient digits (NDQ) based on a number of significant digits of the divisor and the dividend, the determining comprises counting the leading sign bits of the divisor and the dividend;
    normalizing the dividend and divisor to determine a normalized dividend and divisor; and
    calculating NDQ number of quotient digits, the calculating comprises applying a subtractive divider algorithm to the normalized dividend and divisor, and terminating the subtractive divider algorithm after NDQ number of quotient digits are generated.

2. The method of claim 1 wherein the dividend and divisor are encoded in binary.

3. The method of claim 1 wherein the dividend and divisor are encoded in binary and the normalizing comprises left-shifting the dividend and the divisor so that a most significant digit of the dividend is positioned at a left-most bit of an n-bit dividend representation and a most significant digit of the divisor is positioned at a left-most bit of an n-bit divisor representation.

4. The method of claim 1 wherein the subtractive divider algorithm is a non-restoring algorithm.

5. The method of claim 4 wherein the non-restoring algorithm is an SRT algorithm.

6. The method of claim 5, wherein the calculating further comprises generating quotient digits using a quotient select logic circuits, logging the generated quotient digits into a first register when the quotient digit is +1, logging the generated quotient digits into a second register when the quotient digit is −1, and reversing the logging when the divisor is negative.

7. The method of claim 1 wherein the subtractive divider algorithm is a floating point algorithm.

8. The method of claim 7 further comprising converting the divisor to a positive number prior to the calculating when the divisor is negative.

9. The method of claim 1 wherein the subtractive divider algorithm generates multiple quotient bits per cycle, said calculating further comprising removing least significant quotient digits generated by the subtractive divider algorithm in excess of the NDQ number of digits.

10. In a microprocessor, a method for binary division, the method comprising:
    counting the leading sign bits LS2 of an integer divisor;
    counting the leading sign bits LS1 of an integer dividend;
    normalizing the integer divisor having n minus LS2 significant digits by left shifting until a most significant divisor digit is aligned with a most significant bit of an n-bit register;
    normalizing the integer dividend having n-LS1 significant digits by left shifting until a most significant dividend digit is aligned with a most significant bit of an n-bit register;
    calculating a value NDQ as LS2 minus LS1 plus one;
    passing the normalized dividend and the normalized divisor to a floating point divider;
    generating NDQ number of quotient digits using the floating point divider; and terminating the subtractive divider algorithm after NDQ number of quotient digits are generated.

11. The method of claim 10 further comprising:
converting the divisor to positive prior to the generating when the divisor is negative.

12. The method of claim 10, wherein the floating point divider generates multiple quotient bits per cycle, said method further comprising removing least significant quotient digits generated by the floating point divider in excess of the NDQ number of quotient digits.

13. An integer divider, the integer divider comprising:
a first register for receiving a binary representation of a divisor;
a second register for receiving a binary representation of a dividend;
NDQ logic for calculating a maximum possible number of significant digits of a quotient NDQ based on a number of significant digits of the divisor and the dividend, the NDQ logic calculates NDQ by counting leading sign bits of the divisor and dividend;
at least one left shifter for normalizing the divisor and the dividend; and
a subtractive divider for generating NDQ number of quotient digits by dividing the normalized dividend by the normalized divisor.

14. The integer divider of claim 13 further comprising divider control logic for stopping the subtractive divider after the NDQ number of quotient digits are generated.

15. The integer divider of claim 13 wherein the subtractive divider is a floating point divider.

16. The integer divider of claim 15 further comprising an XOR for converting the divisor into a positive number prior to dividing.

17. The integer divider of claim 13 wherein the SRT divider generates multiple quotient digits per cycle, the integer divider further comprising logic for removing least significant ones of quotient digits generated in excess of the NDQ number of quotient digits.

* * * * *